United States Patent

Bradley et al.

Patent Number: 5,972,304
Date of Patent: Oct. 26, 1999

[54] PROCESS FOR THE PRODUCTION OF HEXAAMMINE COBALT NITRATE

[75] Inventors: Steven J. Bradley, N. Ogden, Utah; Gary K. Lund, Malad, Id.; Reed J. Blau, Richmond, Utah

[73] Assignee: Cordant Technologies Inc., Ogden, Utah

[21] Appl. No.: 09/058,823

[22] Filed: Apr. 13, 1998

Related U.S. Application Data

[60] Provisional application No. 60/043,325, Apr. 15, 1997.

[51] Int. Cl.⁶ .................. C01B 21/083; C01B 21/088

[52] U.S. Cl. ............................ 423/386; 423/387

[58] Field of Search .................. 423/386, 387, 423/395

[56] References Cited

U.S. PATENT DOCUMENTS 5,725,699  3/1998  Hinshaw et al. .

OTHER PUBLICATIONS

W. Conrad Fernelius, "Hexamminecobalt (III) Salts", Inorganic Syntheses, vol. 2, 1946, New York, pp. 216–221, XP–002070877 cited in the application see p. 218.

"Kobalt (III)–Ammine", Gmelins Handbuch der Anorganischen Chemie, vol. 58, No. B, 1930, Berlin, pp. 48–56, XP–002070878, see p. 51, paragraph 3.

*Primary Examiner*—Wayne Langel
*Attorney, Agent, or Firm*—Pillsbury MAdison & Sutro Intellectual Property Group

[57] ABSTRACT

A novel process for producing bexaammine cobalt(III) nitrate from a cobalt(II) salt is disclosed. The product is useful in formulating gas generant compositions.

13 Claims, 8 Drawing Sheets

PROCESS SEQUENCE

FIG. 5 — PROCESS SEQUENCE

Temperature versus Time of Literature-based Method

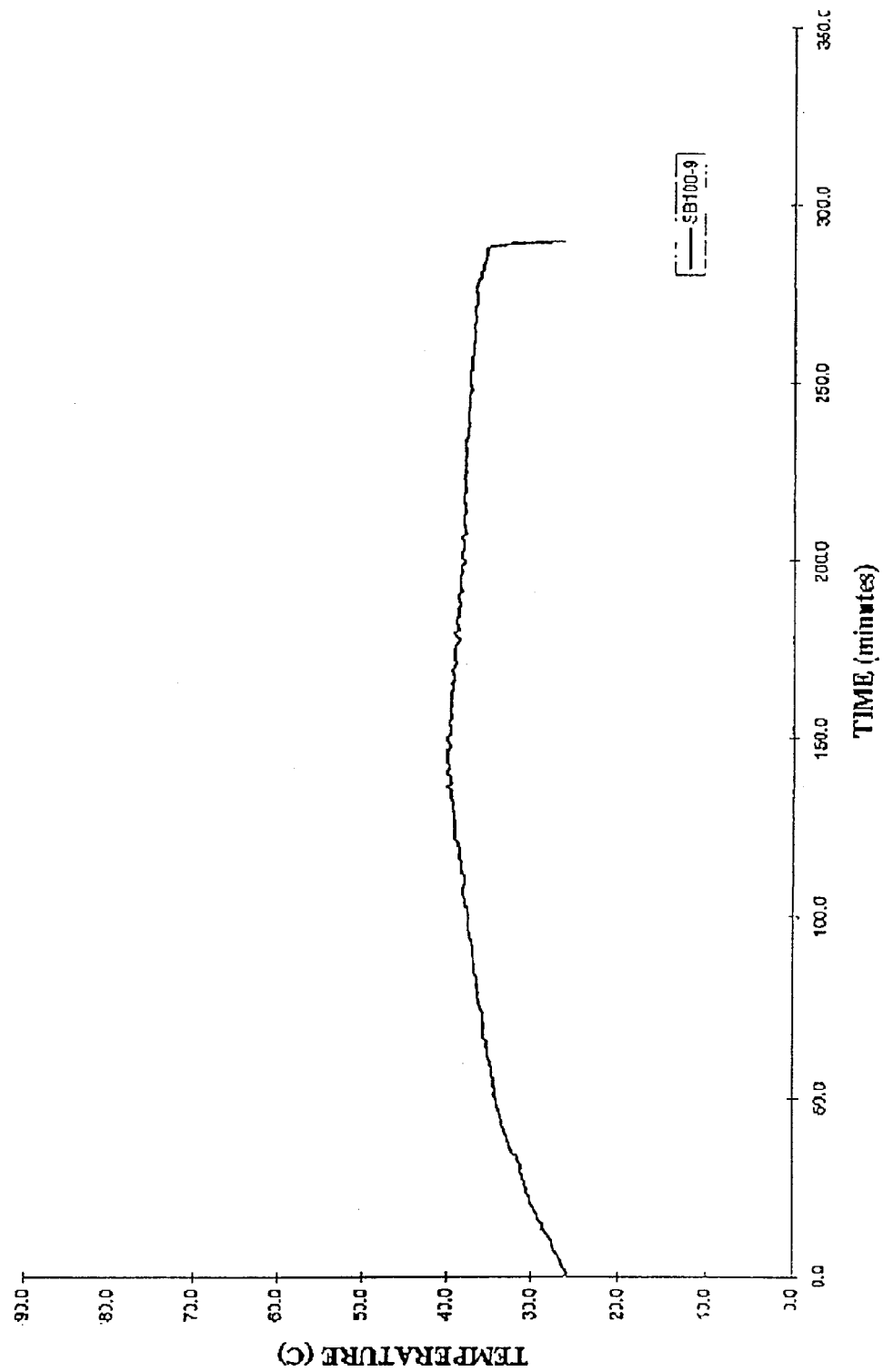

PROCESS FOR THE PRODUCTION OF HEXAAMMINE COBALT NITRATE

RELATED APPLICATIONS

This is a complete application based on U.S. provisional application Ser. No. 60/043,325 filed Apr. 15, 1997, the complete disclosure of which is incorporated herein by reference.

BACKGROUND OF THE INVENTION

1. Field of the Invention

The present invention relates to a low-energy intensive process of producing a hexaammine cobalt(III) nitrate complex, $Co(NH_3)_6(NO_3)_3$, from a cobalt(II) salt, and in particular to the production of a hexaammine cobalt nitrate complex which is capable of rapidly oxidizing or decomposing into significant quantities of gases.

2. Description of the Related Art

Hexaammine cobalt nitrate complex $Co(NH_3)_6(NO_3)_3$, (hereinafter referred to as "HACN" for the purposes of brevity) comprises a cationic metal template of cobalt(III), six neutral ammonia ligands and sufficient nitrate oxidizing anion to balance the charge of the complex.

HACN is associated in the art with its ability, when combined with other ingredients, to undergo rapid combustion or decomposition into significant quantities of gases, such as nitrogen gas and water vapor. The combustion or decomposition of HACN-based formulations into significant quantities of gases can be accomplished almost instantaneously by initiating the gas generation reaction with the application of heat or with the use of suitable conventional igniter devices.

The ability of HACN-based formulations to rapidly form gases, and the capability of HACN-based formulations to generate such gases with conventional devices, makes HACN commercially important as, for example, a gas generant component in automobile air bag supplemental restraint systems. In order to comply with automobile manufacturer applications and criteria, HACN gas generant compositions are most often retained in air bag gas generators in the form of pellets or particles. The near instantaneous generation of gases from HACN containing pellets or particles is sufficiently rapid to operatively deploy a collapsed, inflatable air bag within the fraction of a second that elapses from the time when a car is impacted in an accident to the time when the driver or passenger would otherwise be thrust against the steering wheel or dashboard.

The escalation of the commercial significance of gas generant ingredients such as HACN is manifest by the appearance of air bags in many, if not most, new automobiles as the result of government regulations and consumer demand. This increasing commercial demand, however, has placed a greater burden on the development of a synthesis route for preparing HACN and HACN-based compositions in a cost effective and efficient manner.

Various synthesis routes for preparing HACN are known in the art. One synthesis route is described in some detail in *Inorganic Syntheses*, Volume 2, page 218 (McGraw-Hill, 1946), the complete disclosure of which is incorporated herein by reference. In accordance with this process, HACN is prepared from starting materials such as cobalt(II) nitrate. The cobalt(II) nitrate (0.25 mole of the hexahydrate) is dissolved in water (100 ml) to form an aqueous solution. Then ammonium nitrate (1 mole), activated carbon (0.166 mole) and concentrated ammonia solution (2.5 moles $NH_3$), are sequentially added to the cobalt solution. The solution is then oxidized by bubbling air through the mixture until the solution turns yellow-brown and a yellow-brown solid forms. This yellow-brown solid is washed with a small amount of ice-cold water and is then dissolved on a steam bath in hot (70° C. to 100° C.) water (1300 to 1500 ml) which is slightly acidified with nitric acid. The activated carbon is then removed by hot filtration. The filtrate is treated with concentrated nitric acid (200 ml) and allowed to cool. The precipitated HACN is again washed with water and alcohol and dried at 100° C. Typical yields of HACN achieved by this process are 88% to 90%.

The activated carbon in the previous literature reaction method is added at a concentration of at least 2.3 wt. % carbon based on the theoretical yield of HACN.

According to F. A. Cotton and G. Wilkinson, *Advanced Inorganic Chemistry*, pages 773–774 (4th Ed., John Wiley & Sons, 1980), the complete disclosure of which is incorporated herein by reference, a sufficient concentration of the activated carbon is required as a surface-active catalyst to avoid replacement reaction products, such as, for example, $[Co(NH_3)_5(NO_3)]^{2+}$.

Another literature preparation for hexaammine cobalt(III) salts is described (in "Practical Inorganic Chemistry") ($2^{nd}$ Ed., G. Pass & H. Sutcliffe, Chapman and Hall, 1982), the complete disclosure of which is incorporated herein by reference. This method employs large amounts of carbon (7.6 wt. %) and hydrogen peroxide as the oxidizing agent. The method further requires that the reaction be heated to an elevated temperature near boiling, for example, 70° C. to 90° C., for a sufficient period to completely oxidize the cobalt(II) salt. Additionally the reaction mixture is then cooled to nearly 0° C. to precipitate the HACN product containing the activated carbon. This carbon-containing product is then isolated and purified by dissolution in a hot (70° C. to 90° C.) nitric acid solution, which is then hot filtered to remove the carbon catalyst. The filtrate is then cooled to nearly 0° C. to precipitate the purified HACN product.

The above-described synthesis routes are plagued by several disadvantages. Since only minor amounts (approximately 1%) of carbon are acceptable as contaminants in the intermediate HACN product for use in a gas generant composition, the hot filtration of the activated carbon is necessary to provide a commercially-acceptable product. The yield of HACN from these synthesis routes is generally no greater than 90% to 95% theoretical. Further, the literature routes are very energy intensive inasmuch as the route requires heating during both the reaction step and the hot filtration step. The energy demands are compounded by the crystallization or isolation steps, one of which is interposed between the reaction step and the hot filtration step. The isolation steps can involve cooling the solutions to freezing temperatures of, for example, about 0° C. In addition to its high energy demands, the practice of this process is also associated with the production of a significant amount of potentially environmentally harmful waste. For example, it has been reported that as much as 20 grams of waste are produced per gram of HACN obtained. Additionally the particle size of the HACN isolated is rather large, typically greater than about 200 microns. For use in gas generant compositions these large HACN particles must undergo a subsequent size reduction step; resulting in a further decrease in yield and additional processing.

A need therefore exists to provide a process for producing HACN which saves energy by avoiding multiple alternating heating and cooling steps, which can be performed with a lesser amount of activated carbon and less expensive reagents, which reduces the amount of the potentially environmentally harmful waste, and in which the resultant HACN product is directly obtainable, in high yield, in particles of acceptable size and purity for use in gas generant compositions.

SUMMARY OF THE INVENTION

Objects of the present invention include solving the aforementioned problems associated with the related art and to address the need expressed above.

It is another object of the present invention to provide a synthesis route which produces HACN with a suitable particle size and purity, such that the HACN is suitable for use in gas generant compositions without further size reduction or purification steps.

It is a further object of the present invention to provide a process in which the progress and completeness of the HACN reaction can be more accurately monitored.

In accordance with the principles of the present invention, these and other objects are accomplished by producing a hexaammine cobalt(III) salt from a cobalt(II) salt by the process of the present invention. According to an embodiment of this process, an aqueous solution comprising as ingredients at least one cobalt(II) salt ($CoX_2$), at least one ammonium salt of X, and at least one other ammonia source sufficient to fill the six coordination sites of the Co(III) template is provided, in which X represents a chloride, bromide, perchlorate, and/or nitrate. The final products in those cases are, respectively, hexaammine cobalt chloride, hexaammine cobalt bromide, hexaammine cobalt perchlorate and HACN. The aqueous solution is then permitted to react or age, optionally with periodic stirring or mixing, for a predetermined amount of time, wherein the predetermined amount of time is sufficient to provide a final product with a particle size between about 25 and about 45 microns and an average product yield of not less than 95%, at a temperature range from 20° C. to 35° C. Generally, the aqueous solution is aged for at least about 24 hours at about room temperature. After the aging is completed, at least one surface-active catalyst is introduced into and mixed with the aqueous solution. Preferably, the surface-active catalyst is activated carbon. At least one oxidizer, preferably gaseous, is then introduced into the aqueous solution, and the solution is controlled to a moderate temperature to form the hexaammine cobalt salt. Alternatively, the oxidizer is added prior to or simultaneous with the surface-active catalyst. Finally, the hexaammine cobalt salt is isolated.

The process provided in accordance with the foregoing embodiment is less energy intensive, produces less waste, and yields HACN particles that can be directly incorporated into a gas generant composition, thereby eliminating the need for further purification or size reduction.

The principles of the present invention enunciated above are applicable to the preparation of all types of HACN-containing articles, but find particular acceptance in the production of gas generant particles suitable for use in automobile air bags, for example, supplemental safety restraint systems.

These and other objects, features, and advantages of the present invention will become apparent from the following detailed description when taken in conjunction with the accompanying drawings which illustrate, by way of example, the principles of the present invention.

BRIEF DESCRIPTION OF THE DRAWINGS

The accompanying drawings illustrate the present invention. In such drawings:

FIG. 8 is a graph illustrating the change in temperature over time of the reaction mixture in accordance with the present invention.

DETAILED DESCRIPTION OF THE INVENTION

Figure 1:
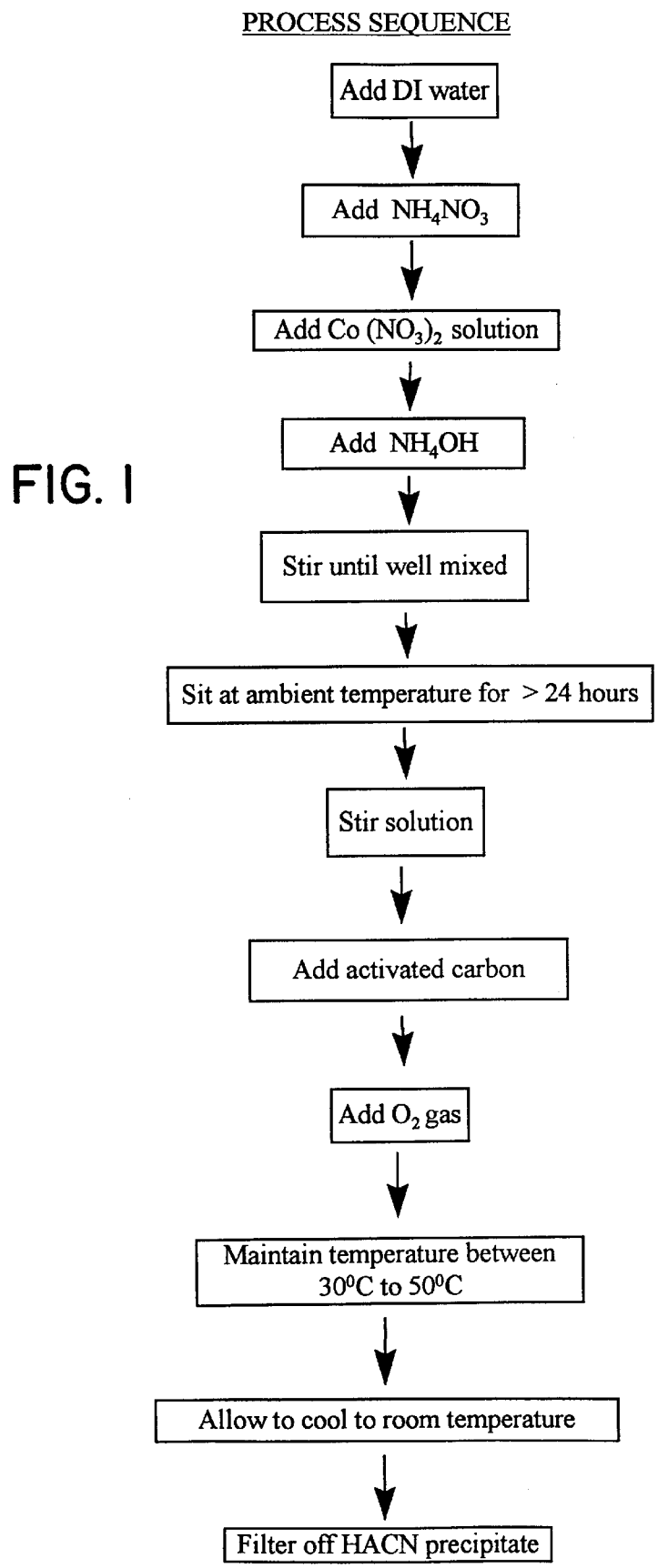
FIG. 1 is a schematic flow diagram of the reaction sequence for the preparation of HACN in accordance with an embodiment of the present invention.

As mentioned above, the process of the present invention involves the preparation of an aqueous reaction solution from at least one ammonia source, at least one cobalt(II) salt having the molecular formula $CoX_2$, and at least one ammonium salt of X. As referred to herein, X is, by preference, an inorganic anion, which is, for instance, at least one of a halogen, such as, chloride, bromide, and nitrate. X can also be a perchlorate, carbonate, oxalate, and formate anion.

The concentration of the ammonia source in the aqueous reaction solution should be sufficient to provide six equivalents of ammonia to the Co(III) template. Preferably, the concentration of the ammonia source is in a range of from about 8 mol to about 10 mols per mol of cobalt in the aqueous reaction solution. Preferably, ammonium hydroxide is selected as the source for forming the ammonia.

The concentration of the ammonium salt of X in the aqueous reaction solution should be sufficient to provide a counteranion (nitrate in the case of HACN) and an ammonia ligand to the Co(III) template, and preferably is in a range of from about 1.5 mols to about 3.0 mols per mol of cobalt in the aqueous reaction solution. The ammonium salt selected should contain the same counteranion as the desired hexaammine cobalt salt to be produced.

Specifically for the production of HACN, the starting cobalt containing material is an aqueous solution of cobalt (II) nitrate. This salt solution is mixed with ammonium nitrate, ammonium hydroxide and sufficient water to form an aqueous reaction solution.

The aqueous reaction solution can be prepared, by way of example and without limitation, in any suitable sized vessel equipped with a mixing or stirring mechanism. The mixture is preferably stirred at a moderate speed and mixed to dissolve the salts and form a substantially homogenous mixture.

The mixed aqueous reaction solution is then allowed to age at a temperature between about 26° C. and about 32° C.

for a predetermined amount of time, wherein the predetermined amount of time is sufficient to provide a final product with a particle size between about 25 and about 45 microns and an average product yield of not less than 95%. The aqueous reaction solution is substantially free of surface-active catalysts and excess oxidizer during this aging step. The temperature range is preferably from about 20° C. to about 35° C., and more preferably about 26° C. to about 32° C. The aging time is preferably at least about 24 hours. The required aging time is at least about 24 hours. The required aging time is influenced by the aging temperature, with longer aging time required at lower temperatures.

After completion of the aging, the aged solution can be transferred to a second vessel, or the aging/reaction process can be completed in a single vessel, equipped with a stirring mechanism, a heat source or temperature control system, and a gas delivery system such as a sparger or tubes, with openings large enough to not plug with cobalt oxide precipitates, sufficient to ensure that the added gas is well-dispersed in the solution. At least one surface-active catalyst is then introduced into the aqueous reaction solution. The aqueous reaction solution can be mixed during or subsequent to the introduction of the surface-active catalyst. The temperature of the solution is controlled to between about 32° C. and about 38° C. Exemplary surface-active catalysts include, without limitation, activated carbon or other surface-active catalysts the presence of which is acceptable in small quantities in gas generant formulations and any combination thereof. Preferably, activated carbon is selected. The ratio of surface-active catalyst to the theoretical yield of the cobalt(III) salt is preferably in a range of from about 0.8 wt. % to about 1.5 wt. %, and more preferably, in a range of from about 0.9 wt. % to about 1.1 wt. %.

Figure 2:
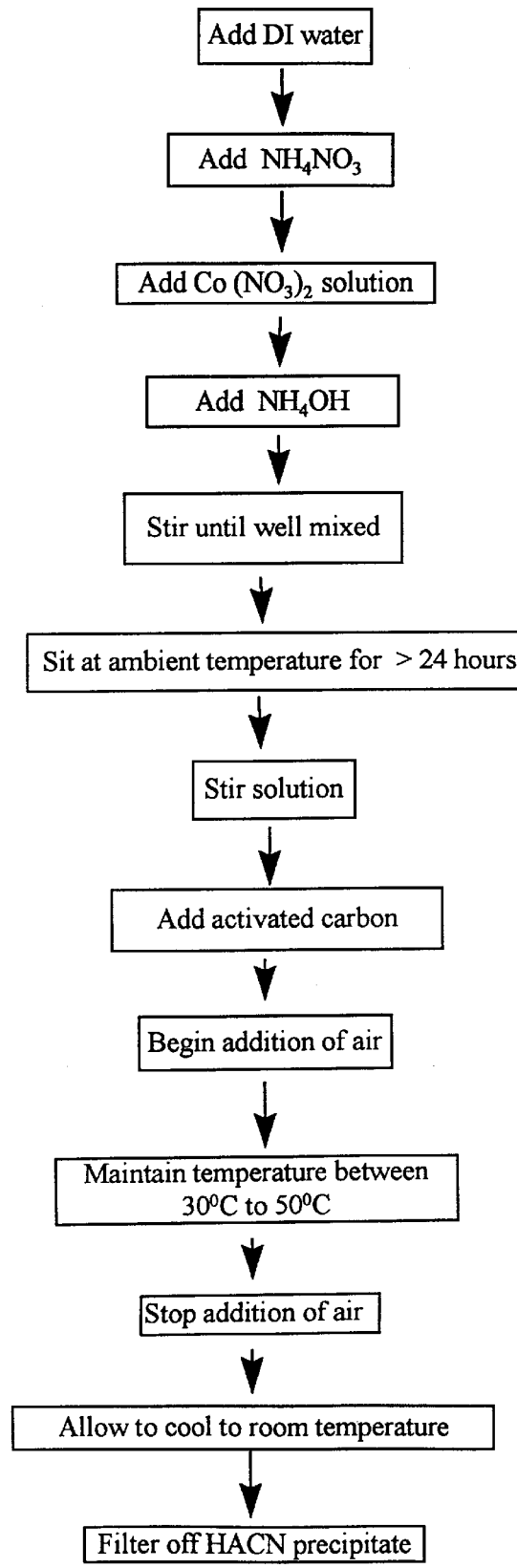
FIG. 2 is a schematic flow diagram of the reaction sequence for the preparation of HACN in accordance with an embodiment of the present invention.

Simultaneous with or subsequent to the addition of the surface-active catalyst, one or more gaseous oxidizers are introduced into the aqueous reaction solution, preferably while stirring is occurring. The gaseous oxidizer can be added via the gas delivery system positioned in proximity to the bottom portion of the reactor so as to promote even distribution of the gas throughout the aqueous reaction solution. Exemplary gaseous oxidizers include, without limitation, an oxygen-containing gas, such as oxygen gas, or a mixture of oxygen gas and nitrogen gas, air, and any combination thereof. FIG. 2 shows addition of air as an exemplary oxygen-containing gas in combination with oxygen gas. By varying the rate of oxygen introduction, the reaction rate and particle size of the final product can be modified. Generally, the amount of gaseous oxidizer added is sufficient to oxidize the cobalt(II) nitrate. An excess of gaseous oxidizers can be used, although, preferably the amount of oxidizer is in a range of from about 0.3 mols to about 0.6 mols of $O_2$ per mol Co, although the concentration of gaseous oxidizer will depend on the particular reagents in the reaction solution and the oxidizer and surface-active catalyst selected.

During the addition of the gaseous oxidizer into the aqueous reaction solution, the reaction solution is maintained, e.g., by heating or cooling, at a moderate temperature sufficiently high to accelerate the reaction, but not so high as to dissolve appreciable amounts of HACN. Preferably, the reaction solution is heated to a temperature in the range of from about 30° C. to about 45° C., and more preferably in a range of from about 32° C. and about 38° C. and allowed to continue until the reaction has gone to completion. Completeness of the reaction can be monitored, for example, by observance of the decrease of absorbency of the reaction solution at a wavelength of 505 nm via a UV/Visible spectrometer. The heating, stirring, and addition of oxygen are stopped upon completion of the reaction.

The HACN product is then isolated from the reaction solution. Isolation can be accomplished by any conventional technique. For example, the mixture can be cooled to room temperature to allow the HACN to precipitate, and the HACN precipitate can then be filtered off and dried. The yield of HACN is typically from about 92% to about 98% based on the theoretical yield of HACN. The carbon catalyst is typically present in the precipitated HACN in a concentration of from about 0.9 wt. % to about 1.1 wt. %.

Figure 7:
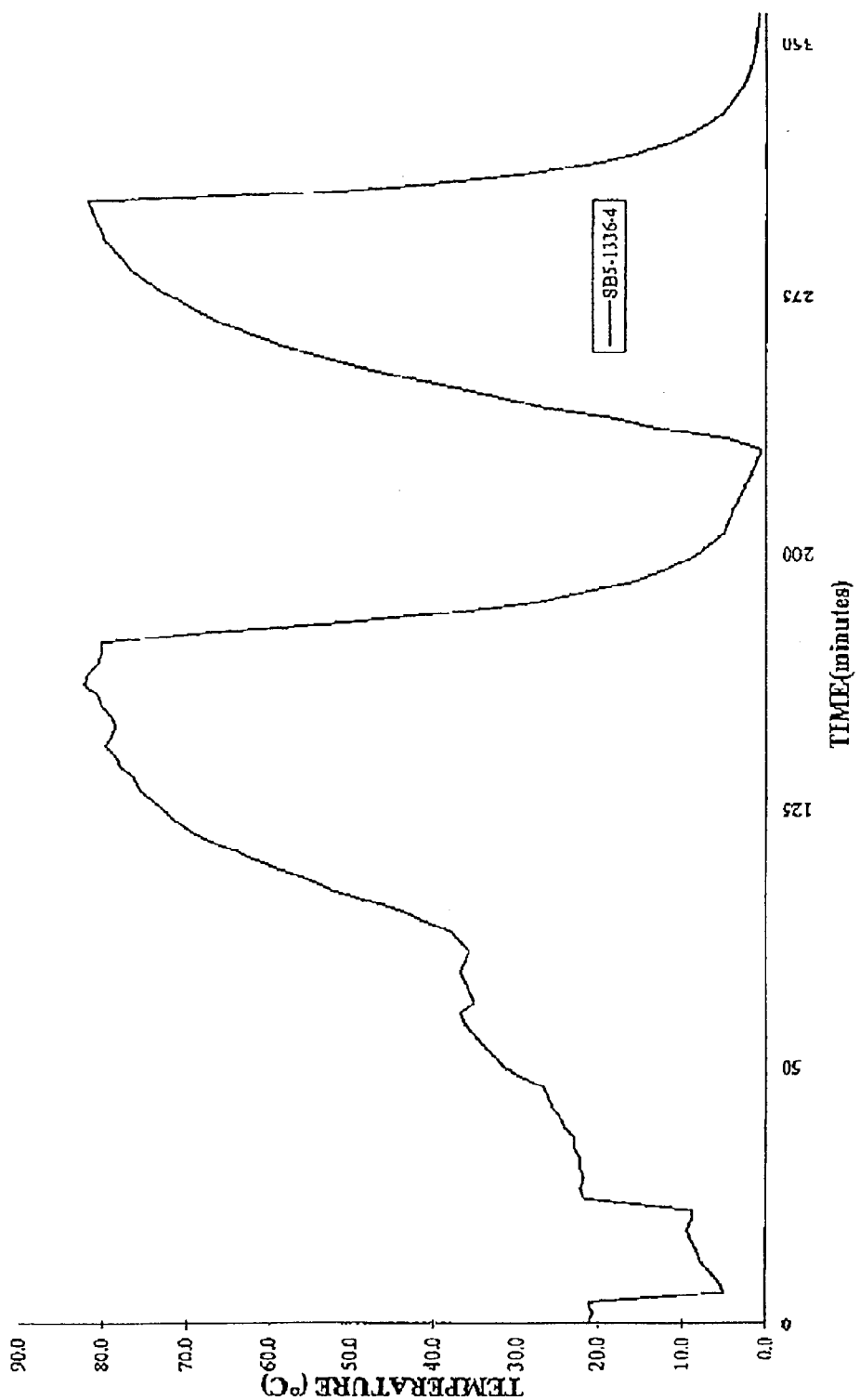
FIG. 7 is a graph illustrating a typical change in temperature over time of the reaction mixture in accordance with a conventional process for preparing HACN.

The comparison of the temperature versus time plots, as illustrated in FIGS. 7 and 8, for the process according to the literature method and a process according to the present invention, clearly shows the advantage of the present invention. The method according to the present invention does not undergo the temperature extremes, and accompanying energy consumption, associated with the method according to the literature method.

In accordance with still another variation of this process, the HACN as produced by the process according to the invention, can be directly mixed with appropriate and desirable compounds or solutions and fashioned into an article of a desired configuration and dimension. HACN-containing compositions find particular utility as gas generant particles in automobile air bags. In such application, the HACN particles preferably have an average particle size in a range of from about 25 microns to about 45 microns. The HACN particles are then mixed with additives, and formed into pellets for use in gas generant compositions. Exemplary additives include, without limitation, oxidizing agents and/or fuels which promote efficient combustion or decomposition and gas generation. Suitable oxidizing agents include, by way of example and without limitation, one or more of the following: oxidizing agents, such as nitrates, nitrites, chlorates, perchlorates, peroxidies, metal oxides, basic metal nitrates, and other similar oxidizing materials. Suitable secondary organic fuels include, by way of example and without limitation, one or more of the following: urea, guanidine, nitrate, nitro-guanidine and other similar conventional fuel materials such as conventional organic binders including water-soluble organic binders. Gas generant compositions are described in U.S. Pat. Nos. 5,516,377, 5,592,812 and 5,608,183, the complete disclosures of which are incorporated herein by reference.

In applications where the purity of the HACN is not critical and a low level of carbon impurity can be tolerated, the step of filtrating the activated carbon from the reaction mixture can be eliminated. It has been found that about a 1 wt. % carbon impurity present in the HACN used in gas generant compositions does not adversely affect ballistic performance, and in fact increases the structural integrity of gas generant pellets.

Synthesis based on the related art method described in the Background Section use approximately 4 grams of activated carbon per 100 grams of HACN produced, and thus removal of the carbon and subsequent recrystallization of the HACN was required before the HACN could be used in gas generant compositions. The method of the present invention utilizes approximately 1 gram of carbon per 100 grams of HACN produced. Thus, the final HACN product by this procedure can go directly into a gas generant composition without further purification.

In accordance with yet another variation to this invention, the aging of the aqueous reaction solution and subsequent addition of activated carbon and oxygen gas can all occur in one suitably equipped vessel.

In its broadest aspects, several variations and modifications to our above-discussed processes can be implemented without departing from the scope of the present invention. For example, the ammonium nitrate can be replaced with (or can be used in addition to) nitric acid in combination with an appropriate $NH_3$ source and the ammonium hydroxide solution can be replaced with (or can be used in addition to) an ammonia-containing gas, such as, anhydrous ammonia gas, which can be bubbled into the aqueous solution. Employing anhydrous ammonia gas is advantageous inasmuch as it reduces the overall reaction volume and hence the waste produced by the reaction and additionally reduces the raw material costs. In accordance with this variation, the addition of ammonia gas can be commenced after the nitric acid is mixed with the $Co(NO_3)_2$ solution and is preferably completed before the surface-active catalyst is added. The addition of oxygen gas to the aged reaction mixture can be commenced after the ammonia is added, and is preferably continued until the absorbance at 505 nm is minimized.

In accordance with another variation to this invention, waste filtrate can be recycled and used to form the aqueous solution to be aged. The waste filtrate can be subjected to evaporation and drying steps in order to remove the water and produce a dry solid residue. This dry solid residue can then be recycled into subsequent HACN syntheses. More preferably, the filtrate is subjected to evaporation in order to remove the majority of the water therefrom and produce a concentrated liquid. The recycled filtrate replaces some of the ammonium nitrate in the subsequent reaction. Advantageously, the total disposed waste is reduced by practicing this recycling step.

The cost of the overall procedure can be further reduced by utilizing cheaper raw materials for the starting reagents. For example, instead of cobalt nitrate crystals, a solution of cobalt nitrate can be utilized. Also, the mother liquor can be recycled to recover the cobalt for use in making $Co(NO_3)_2$.

Figure 3:
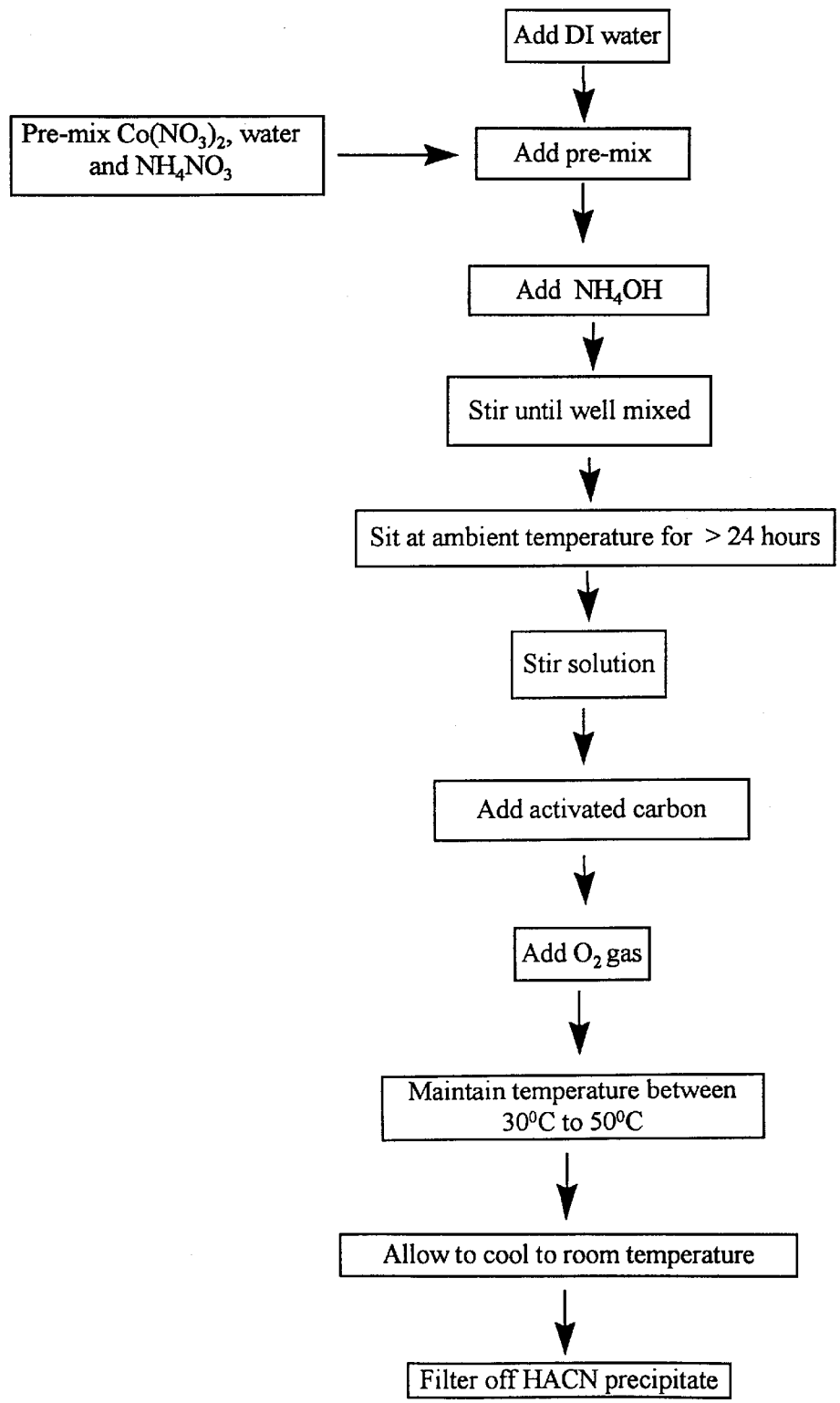
FIG. 3 is a schematic flow diagram of the reaction sequence for the preparation of HACN in accordance with an embodiment of the present invention.

FIG. 3 illustrates use of a pre-mix of $Co(NO_3)_2$ and ammonium nitrate. As shown, the pre-mix can be separately prepared and used as such for the ammonium hydroxide addition.

Figure 4:
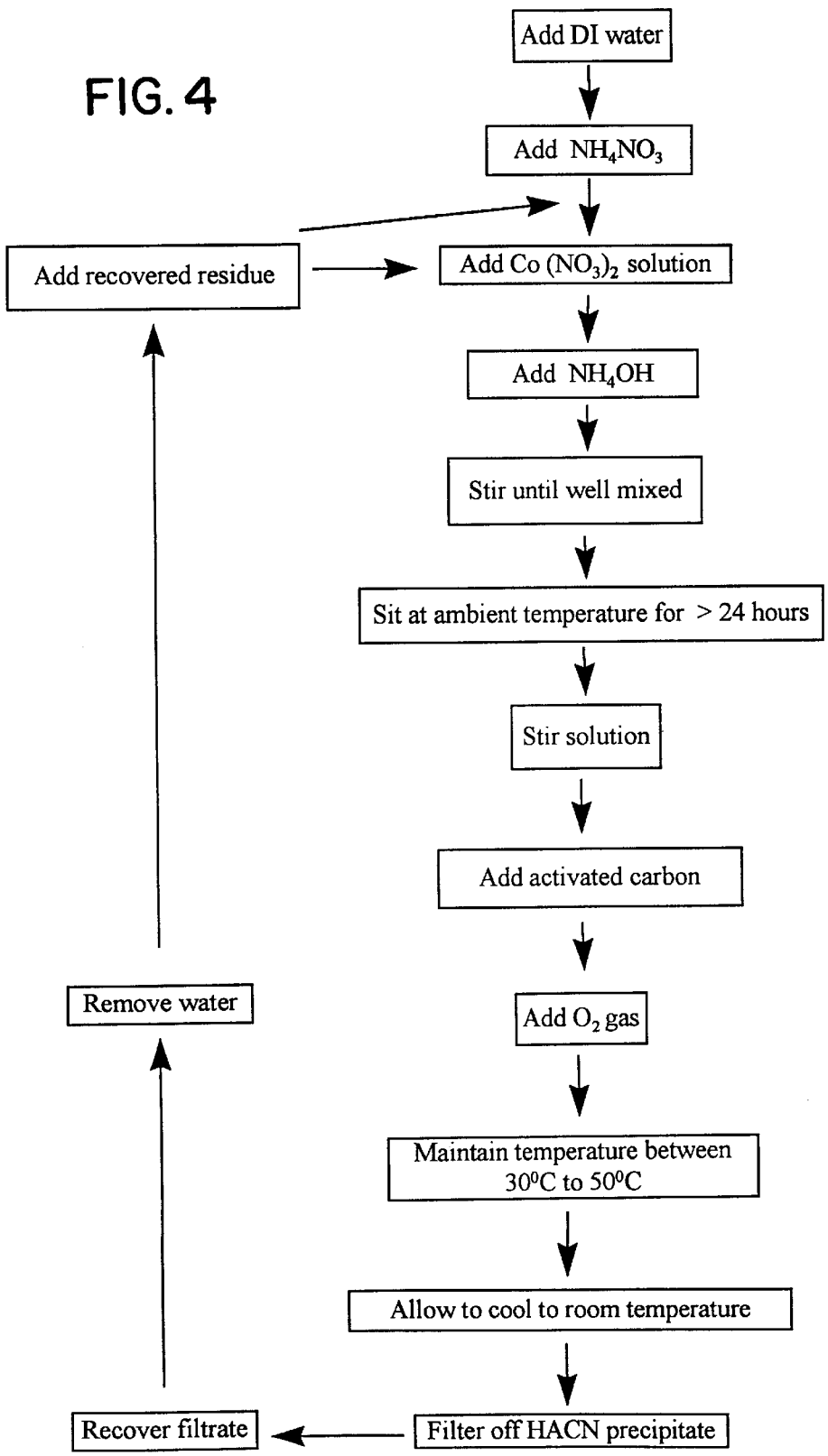
FIG. 4 is a schematic flow diagram of the reaction sequence for the preparation of HACN in accordance with an embodiment of the present invention.
Figure 5:
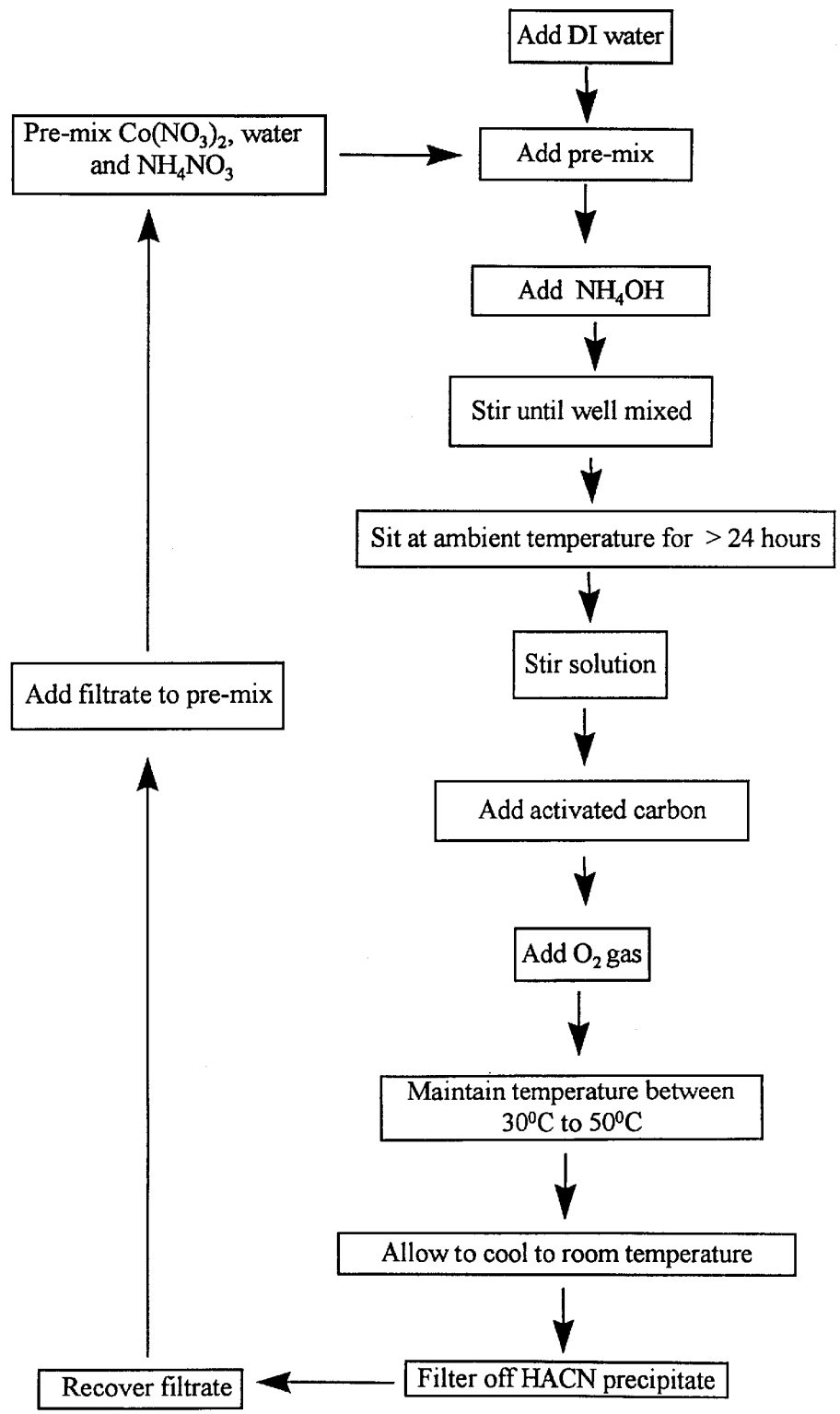
FIG. 5 is a schematic flow diagram of the reaction sequence for the preparation of HACN in accordance with an embodiment of the present invention.
Figure 6:
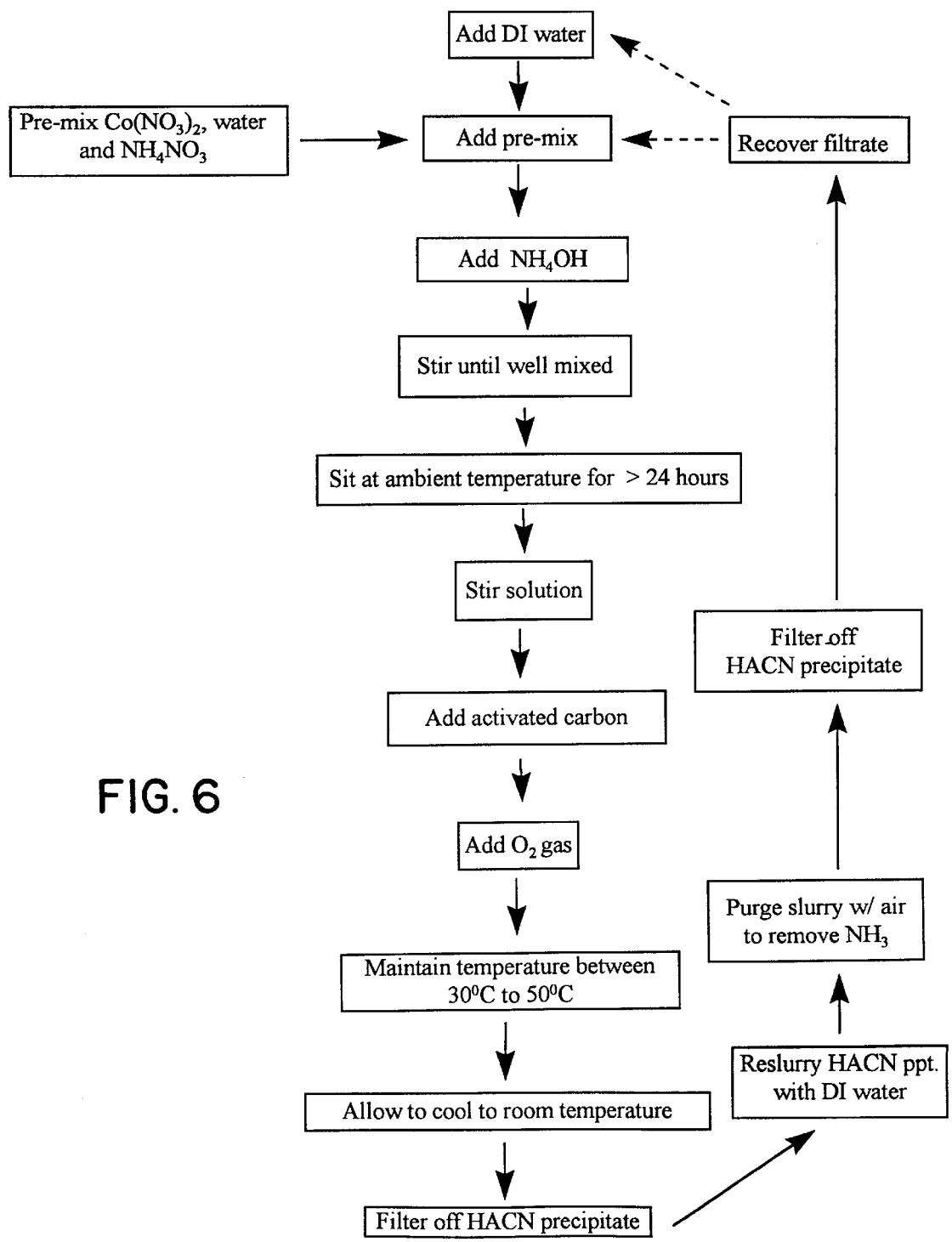
FIG. 6 is a schematic flow diagram of a reaction sequence for the preparation of HACN which includes further steps of re-slurrying in DI water and additional ammonia removal, an additional filtration step with further HACN recovery; and recycle of any or all of the DI water, the $NH_4NO_3$ or the $Co(NO_3)_2$ solution in which each of these steps is optional.

FIG. 4 and FIG. 5 illustrate re-uses of the material recovered from the reaction filtrate. These embodiments can be used in combination, or combined, as desired, with other process embodiments.

The various embodiments described and/or depicted herein can be combined as described.

The invention will be further illustrated in more detail by the following non-limiting examples.

EXAMPLES

Example 1

A 100 gallon reactor equipped with an impeller, a heating source, and a large diameter (5 mm) gas delivery tube located directly beneath the impeller was charged with 28.0 gallon deionized water. Ammonium nitrate, (106.0 lbs., 601 mol $NH_4NO_3$, Eldorado Chemical) aqueous cobalt(II) nitrate solution, (170.0 lbs., 196 mol Co, OMG, 15% cobalt), and ammonium hydroxide solution, (207 lbs., 1600 mol $NH_3$, VWR, 29% $NH_3$) were added to the reactor. The solution was then stirred at moderate speed (100 rpm) until well mixed, approximately 5 minutes The impeller was turned off and the mixture allowed to sit for 68 hours at 24° C. to 26° C.

The impeller was turned on moderate speed (100 rpm) and activated carbon (670 g., 56 mol C, Darco) was added to the solution. Oxygen gas was then added at a rate of 15 SCFH (standard cubic feet per hour) via the gas delivery tube. Heat was added, as necessary, to maintain the temperature of the solution between 35° C. and 40° C. The solution was monitored at 505 nm via UV/Vis spectrometry. When the absorbance, of a 1:12 diluted aqueous sample, at 505 nm was less than 0.110 the impeller and addition of oxygen were stopped, and the solution was allowed to cool to room temperature. The gold/orange precipitate was filtered off, washed with deionized water and dried.

Yield: 97% of theoretical HACN. 1.1 wt. % C. Median particle size: 34 microns. Waste generated: approximately 70 gallons of reaction liquid and 30 gallons of wash water.

Example 2

A five gallon vessel equipped with an impeller, a heating source and two large diameter (3 mm) gas delivery tubes located directly beneath the impeller was charged with 3000 ml deionized water. While stirring the water, concentrated nitric acid (360 g, 5.4 mol, VWR) was slowly added. Cobalt(II) nitrate (880 g, 3.0 mol Co, OMG) and activated carbon (40 g, 3.3 mol C, Darco) were added to the reactor. Commercial grade ammonia gas was then added to the solution. After approximately 500 grams of ammonia were added, high purity oxygen gas was added through the second gas delivery tube. After a total of 527 grams of ammonia gas (30 mol $NH_3$) was added the flow of ammonia gas was shut off. During the addition of $NH_3$ the temperature was increased to approximately 63° C. Oxygen gas was added until a pinkish color in the oxygen bubbles in the solution had disappeared, then the oxygen flow was shut off. The solution was then heated to 80° C. for 1 hour.

The heat was turned off and the solution rapidly cooled to 0° C. The gold/orange precipitate was filtered off and then recrystallized from a hot dilute nitric acid solution.

Yield: 93% of theoretical HACN. 0.06 wt. % C after hot filtration. Waste generated: 3200 g during synthesis and 14,560 g during recrystallization.

Example 3

A 19,000 ml vessel equipped with an impeller, a heating source, and a large diameter (3 mm) gas delivery tube located directly beneath the impeller was charged with 1300 ml deionized water. Commercial grade ammonium nitrate, (380 g, 3.5 mol $NH_4NO_3$) aqueous cobalt(II) nitrate solution (1173 g, 3.0 mol Co, OMG, 15% cobalt), and solid material recovered from prior HACN preparations composed primarily of ammonium nitrate and cobalt nitrate (440 g) were added to the reactor. The solution was then stirred at moderate speed (200 rpm) until well mixed, approximately 5 minutes. The impeller was turned off and the mixture allowed to sit for approximately 26 hours at 23° C. to 30° C.

The impeller was turned on moderate speed (200 rpm) and activated carbon (10 g, 0.83 mole C, Darco) was added to the solution. oxygen gas was then added at a rate of 5 SCFH via the gas delivery tube. Heat was added, as necessary, to maintain the temperature of the solution between 35° C. and 42° C. The solution was monitored at 505 nm via UV/Vis spectrometry. When the absorbance, of a 1:12 diluted sample, at 505 nm was less than 0.110 the impeller and addition of oxygen were stopped, and the solution was allowed to cool to room temperature. The gold/orange precipitate was filtered off and dried.

Yield: 95% of the theoretical HACN. 0.91 wt. % C. Medial particle size: 29 microns. Waste generated: 2220 g.

It will thus be seen that the objectives and principles of this invention have been fully and effectively accomplished. It will be realized, however, that the foregoing preferred specific embodiments have been shown and described for the purpose of this invention and are subject to change without departure from such principles. Therefore, this invention includes all variations, modifications, and improvements encompassed within the spirit and scope of the appended claims.

What we claim is:

1. A process of making hexaammine cobalt (III) salt comprising the steps of:
   (a) providing a solution of $Co(X)_2$ and $NH_4X$, wherein X is at least one selected from the group consisting of chloride, bromide, perchlorate, and nitrate;
   (b) combining the solution from (a) with an ammonia source comprising ammonium hydroxide, an ammonia-containing gas or a combination thereof;
   (c) aging the combination obtained in (b) to provide a final hexaammine cobalt (III) salt with a particle size of between about 25 and about 45 microns;
   (d) adding a surface active catalyst to the aged combination in (c);
   (e) introducing an oxygen-containing gaseous oxidizer to the aged combination in (d) to form a reaction mixture;
   (f) maintaining the temperature of the reaction mixture in the range of 30° C. to 50° C.; and
   (g) cooling the mixture from (f) and recovering said hexaammine cobalt (III) salt therefrom as an admixture with the surface active catalyst.

2. The process according to claim 1, wherein X is nitrate.

3. The process according to claim 2, wherein the solution in step (a) is formulated from constituents comprising water, ammonium nitrate and $Co(NO_3)_2$.

4. The process according to claim 2, wherein said process the hexaammine cobalt(III) nitrate salt (HACN) is the hexaammine cobalt(III) salt, and HACN is recovered by filtration and cobalt is recovered from the obtained filtrate; $Co(NO_3)_2$ is prepared using the recovered cobalt; and the thus prepared $Co(NO_3)_2$ is recycled to prepare a solution for use in step (a).

5. The process according to claim 1, wherein the oxygen-containing gaseous oxidizer comprises oxygen gas, nitrogen-oxygen gas mixtures, air or mixtures thereof.

6. The process according to claim 1, wherein aging in step (b) is conducted for 24 hours.

7. The process according to claim 1, wherein the aging in step (b) is conducted at a temperature from 20° C. to 35° C.

8. The process according to claim 2, wherein the concentration of $NH_4NO_3$ is from about 1.5 mols to about 3.0 mols per mol of cobalt.

9. The process according to claim 1, wherein the surface active catalyst comprises activated carbon.

10. The process according to claim 1, 2, 8 or 9, wherein (0.8 wt. % to 1.5 wt. % of the) surface active catalyst is used, in relation to the theoretical yield of recovered HACN.

11. The process according to claim 1, wherein said process includes the further step of formulating a gas generant composition using the recovered hexaammine cobalt(III) salt.

12. The process according to claim 2, wherein said process includes the further step of formulating a HACN-containing gas generant composition using the recovered HACN.

13. The process according to claim 1, wherein said process includes the further step of purifying said hexaammine cobalt (III) salt by recrystallization from water.

* * * * *